United States Patent [19]

Hang

[11] 4,049,872
[45] Sept. 20, 1977

[54] GLASS FRIT COMPOSITION FOR SEALING WINDOW GLASS

[75] Inventor: Kenneth Warren Hang, East Windsor, N.J.

[73] Assignee: RCA Corporation, New York, N.Y.

[21] Appl. No.: 704,325

[22] Filed: July 12, 1976

[51] Int. Cl.² .......................... C03C 3/22; C03C 3/14; B32B 17/06

[52] U.S. Cl. ............................... 428/427; 106/47 R; 156/39.6

[58] Field of Search ........................ 106/39.6, 47 R; 428/428, 427, 426

[56] References Cited

U.S. PATENT DOCUMENTS

| | | | |
|---|---|---|---|
| 3,312,556 | 4/1967 | Oikawa et al. | 106/47 R |
| 3,912,525 | 10/1975 | Monneraye et al. | 106/39.6 |

Primary Examiner—Winston A. Douglas
Assistant Examiner—Mark Bell
Attorney, Agent, or Firm—E. M. Whitacre; D. S. Cohen

[57] ABSTRACT

A barium-lithium-alumina-borate glass frit includes the following by weight on an oxide basis: 10.5–16.7% BaO; 10–11% $Li_2O$; 2–3% $Al_2O_3$; and 70–77% $B_2O_3$. The frit can be fired, i.e., fused from powdered form to solid sealing glass, at low temperatures, e.g., about 530° C. Firing can take place in an atmosphere which is inert, oxidizing, or reducing. After firing for a sufficient time, e.g., 3 hours, the sealing glass becomes fully devitrified. The devitrified sealing glass has an expansion coefficient substantially the same as that of window glass, i.e., about $90 \times 10^{-7}/°$ C. The devitrified sealing glass can be reheated to temperatures in excess of 530° C without deterioration or strains developing in a sealed joint.

7 Claims, 3 Drawing Figures

GLASS FRIT COMPOSITION FOR SEALING WINDOW GLASS

BACKGROUND OF THE INVENTION

This invention relates to a glass frit composition, and particularly to a glass frit which is suitable for use in sealing window glass.

Display devices have been proposed which include a plurality of spaced parallel glass plates which are disposed between a back surface and a front viewing surface. The back surface includes a cathode area and the front surface includes a phosphor viewing screen. The glass plates are maintained in fixed position with an edge of each of the glass plates bonded to a common surface. The common surface may be a glass surface, e.g., either the front or back surface. It would be desirable to employ relatively inexpensive window glass both as the material for the glass plates and as the common surface. Window glass is generally characterized in the art as having an expansion coefficient of about $90 \times 10^{-7}/°C$, hereinafter more simply referred to as 90. Soda-lime silicate glasses are among the typical window glasses.

In order to make the bonds or seals between the glass plates and the common surface, a sealing material is required. Many glass frit compositions exist which are useful in sealing or bonding various kinds of glasses. Among the most desirable are devitrifiable glass frits, such as those described in U.S. Pat. No. 2,889,952 entitled, "Composite Article and Method," issued June 9, 1959, to S. A. Claypoole. Devitrified glass is generally defined to mean that at least part of the glass is converted, or devitrified, to a crystalline phase and the remainder is retained in the vitreous phase. In this phase, the thermal and other physical characteristics of the devitrified glass, such as viscosity, density and expansion coefficient, may differ from those of the parent glass. In the case of a devitrified glass containing a high volume fraction of crystalline phase e.g., at least about 60 volume percent, the physical characteristics are substantially determined by the crystalline phase. As a result of the devitrified phase, a bond employing such a frit with a high crystalline content may be reheated to a temperature in excess of that at which the bond was formed, without causing softening of deterioration thereto.

However, the previously described display device presents three requirements particular to window glass which are not met by any known glass frit. First, the frit must be a low firing material, e.g., less than about 550° C, while having physical stability at temperatures equal to or greater than its firing temperature. Second, it is desirable that the frit be fireable in an atmosphere which is reducing, inert, or oxidizing. It is particularly desirable that the frit be fireable in a reducing or inert atmosphere without becoming chemically reduced. Otherwise, the frit may become electrically conductive and develop conducting paths which can interfere with the electrical operation of the display device. This requirement eliminates all glasses which include lead oxide as a major constituent. Third, it is desirable that the vitreous (non-crystalline) and devitrified (crystalline) forms of the glass have expansion coefficients which are compatible with that of window glass. The third requirement reduces the likelihood of stress which could easily develop during the sealing process as the glass is converted from a vitreous body to a devitrified body.

SUMMARY OF THE INVENTION

A devitrifiable glass frit consists essentially by weight on an oxide basis of about 10–20% BaO; 10–11% $Li_2O$; 2–7% $Al_2O_3$; and 66–77% $B_2O_3$.

DETAILED DESCRIPTION OF THE INVENTION

The devitrifiable glass frit of the present invention consists essentially of four constituents: BaO; $Li_2O$; $Al_2O_3$; and $B_2O_3$. By this it is meant that other elements of any essential significance to the combination are excluded. Generally, this means that the glass frits of the present invention include less than about 5 weight percent of impurities. After being fired and fully devitrified, the glass includes a crystalline content of $Li_2O.2B_2O_3$ which is between about 70 to about 75 volume percent.

More specifically, the frit compositions of the present invention include the following on an oxide basis: about 10–20% BaO; 10–11% $Li_2O$; 2–7% $Al_2O_3$, and 66–77% $B_2O_3$. Particularly preferable are those glass frit compositions which include the following on an oxide basis: about 10.5– 16.7% BaO; 10–11% $Li_2O$; 2–3% $Al_2O_3$; and 70–77% $B_2O_3$. The composition of several of the glass frits of the present invention are shown below in Table I. The temperature expansion coefficients of the glass frits were determined after each had been fired and devitrified at 550° C for 3 hours. After this treatment, the frits have been transformed into devitrified glasses.

TABLE I
WEIGHT PERCENT COMPOSITION OF VARIOUS GLASS FRITS

| Frit | BaO | $Li_2O$ | $Al_2O_3$ | $B_2O_3$ | Expansion Coefficient of devitrified glass $a0 - 550°$ C in/in ° C |
|---|---|---|---|---|---|
| #1 | 12.2 | 9.8 | 2.7 | 75.3 | $88.2 \times 10^{-7}$ |
| #2 | 10.7 | 10.8 | 2.4 | 76.2 | $94.7 \times 10^{-7}$ |
| #3 | 12.3 | 10.9 | 2.3 | 74.6 | $90.9 \times 10^{-7}$ |
| #4 | 16.6 | 10.6 | 2.7 | 70.1 | $91.9 \times 10^{-7}$ |
| #5 | 13.6 | 10.8 | 2.3 | 73.4 | $84.4 \times 10^{-7}$ |
| #6 | 19.6 | 10.4 | 2.6 | 67.4 | $97.9 \times 10^{-7}$ |
| #7 | 16.6 | 10.5 | 3.5 | 69.3 | $112.8 \times 10^{-7}$ |
| #8 | 16.4 | 10.4 | 6.6 | 66.6 | $102.0 \times 10^{-7}$ |

Figure 1:
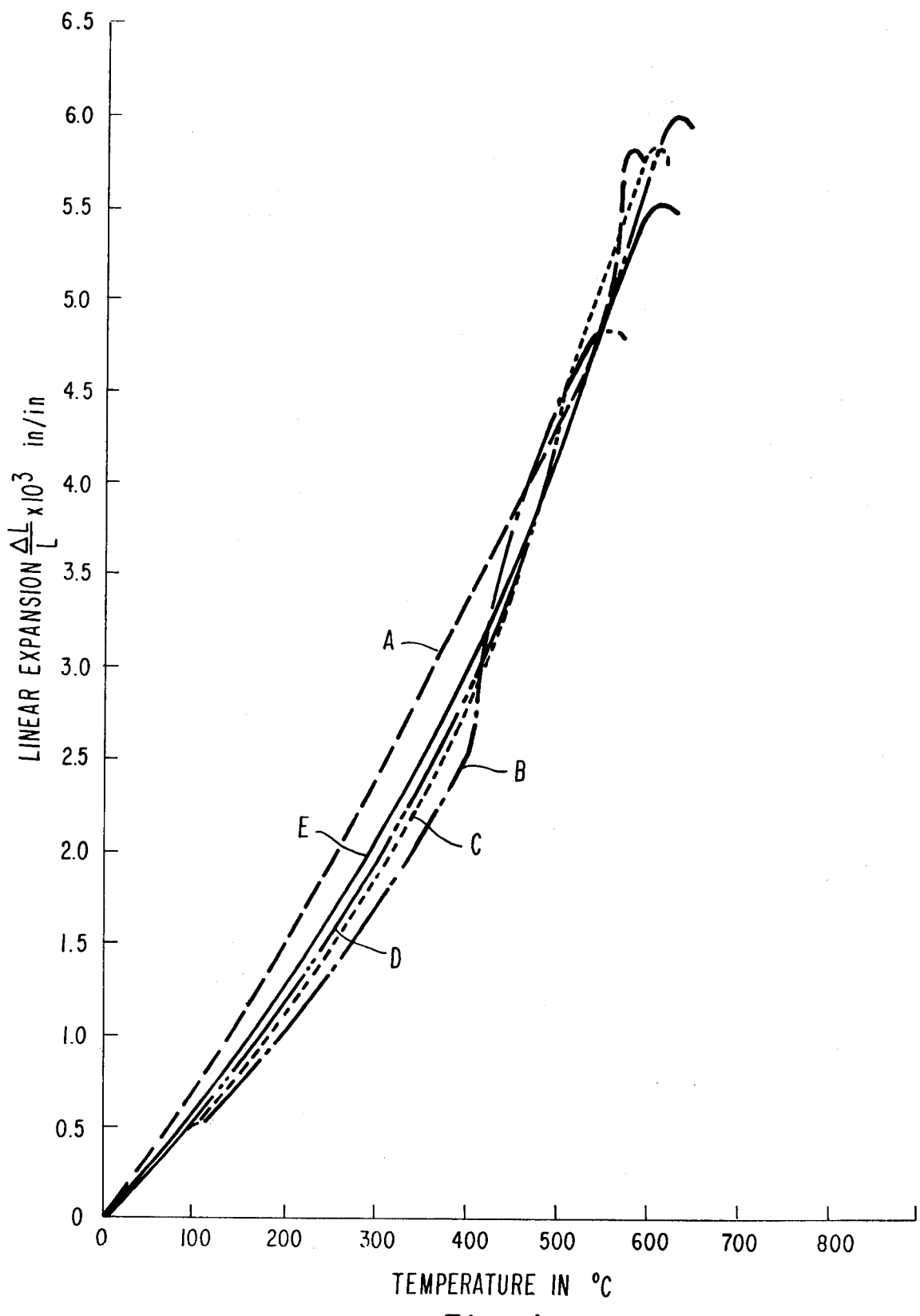
FIG. 1 is a graph showing temperature expansion curves for several devitrifed glass compositions of the present invention as compared to the expansion curve for window glass.

The temperature coefficients for several of these devitrified glasses in relation to the expansion coefficient of window glass ($90 \times 10^{-7}/°$ C) is shown in FIG. 1. In FIG. 1, curve A represents window glass, curve B represents devitrified glass 1, curve C represents devitrified glass 2, curve D represents devitrified glass 3, and curve E represents devitrified glass 4. In FIG. 1, the slope of each curve represents the expansion coefficient for a particular devitrified glass composition.

It should be noted that the frit compositon is the same whether determined before sealing, i.e., in powdered form, or after sealing, i.e., in devitrified form. This identity of composition is due to the fact that no new substance is added and no substance is lost in the transition from powder to devitrified glass, i.e., during firing. Therefore, for convenience, the composition of each of the samples was determined when the frit was synthesized into powdered form. It should also be noted that the quantitative expansion coefficients for the devitrified glasses shown in Table I were derived from FIG. 1. The expansion curves shown in FIG. 1 were obtained by a conventional procedure which included the use of a Harrop fused silica dilatometer.

Referring again to Table I, I have found devitrified frit glasses 2, 3 and 4 to be particularly desirable for use in sealing window glass. After firing and devitrification at 550° C for 3 hours, each of these samples has an expansion coefficient over the temperature range of 0° C to 550° C which is substantially the same as that of window glass, i.e., about 90. This can be better appreciated by referring to FIG. 1 where the slopes of the curves for devitrified glasses 2–4 (C, D, E) are substantially the same as the slope of the curve (A) for window glass. It is important to note that near the preferred sealing temperature of about 550° C, the expansion curves of the devitrified glasses 2–4 (C, D, E) are smooth and nearly identical to the expansion curve (A) of the window glass. The deviation of the expansion curves (B–E) of the devitrified glasses from the expansion curve (A) of window glass at temperatures below 550° C to ambient temperatures results in a low and uniform stress condition which progressively diminishes as ambient temperature is reached.

Figure 2:
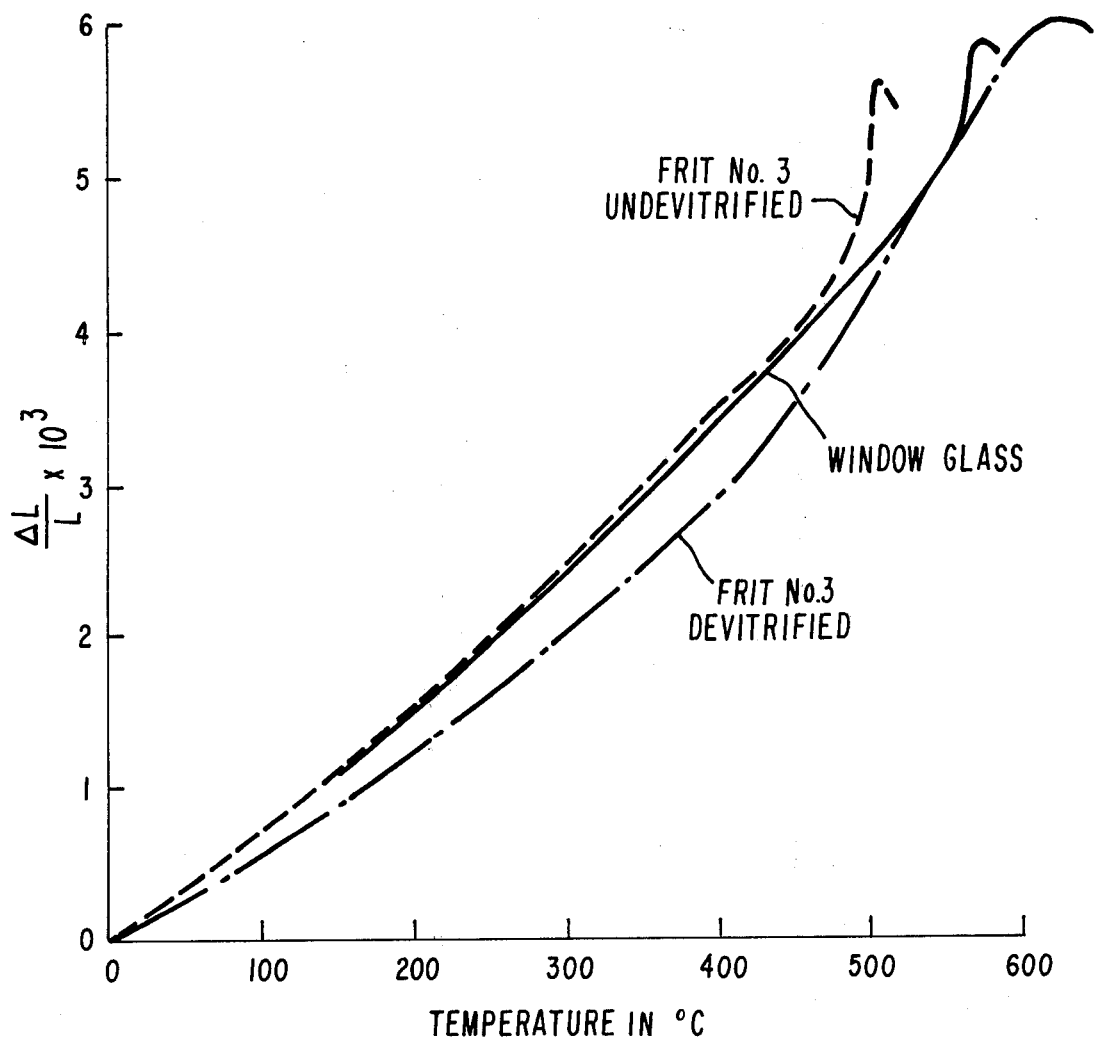
FIG. 2 is a graph showing the expansion curve for one frit composition of the present invention taken before and after devitrificatin, as compared to the expansion curve for window glass.

An important property of the frits of the present invention is that, if they are incompletely devitrified during firing, they still continue to exhibit expansion coefficients which are substantially the same as that of the window glass, i.e., the expansion coefficient of the fused glass is substantially the same when the material is incompletely or completely devitrified. By incompletely devitrified, it is meant that the crystalline content ($Li_2O \cdot 2B_2O_3$) in the fused glass is less than about 70 volume percent. By completely devitrified, it is meant that the crystalline content ($Li_2O \cdot 2B_2O_3$) in the fused glass is greater than about 70 volume percent, preferably between about 70 to about 75 volume percent. Thus, the curves for the incompletely devitrified glasses form a smooth continuum until the curve for the devitrified glass is obtained, as shown in FIG. 2. In FIG. 2, frit 3 is shown both incompletely and completely devitrified in relation to window glass. The fact that the expansion coefficient is constant means that, if incompletely devitrified, the sealing process can be repeated without causing damage to the structure to be sealed since the frit composition remains a good match to the window glass both before, and after devitrification.

GENERAL CONSIDERATIONS

The glass frit samples shown in Table I were prepared into powdered form by the reactive fusion of the following raw materials: BaO; $Li_2CO_3$; $Al_2O_3$; and $B_2O_3$. The raw materials were fused at 1200° C in a crucible which comprised platinum and 10% rhodium. In order to maintain the vitreous state with the crystallizable glass composition, the melt was covered and held at about 1200° C for about 10 minutes. The melt was then quenched on a graphite plate. In order to prevent hydration of the glass, contact of the melt with water was avoided. It should be noted at this point that if the potential crystalline content ($Li_2O \cdot 2B_2O_3$) of the frit is too high, i.e., greater than about 80 volume percent, the frit will crystallize upon being quenched, rendering the composition useless for sealing window glass. The cooled glass was then coarse crushed with a mechanical crusher. In order to produce a glass powder, the crushed glass was then milled in an alumina mill using toluene as a milling vehicle. The glass was milled to achieve a 5 micron mean particle size. Then, the toluene was evaporated from the mill slurry leaving the glass powder. An organic binder which comprised a solution of 1–3% nitrocellulose in amyl-acetate was added to the powder and thoroughly mixed to facilitate the application of the glass powder during the subsequent sealing process. This particular binder is suitable for use when the sealing process takes place in an ordinary air atmosphere, i.e., an oxidizing atmosphere.

Generally, when employed for sealing, the glass frits of the present invention are preferably fired (fused) into solid form by heating to low firing temperatures of about 500–550° C for a time period suitable for the type and mass of the window glass being sealed, e.g., from about 10 minutes to about three hours. At this point, the glass frit has generally been devitrified to the point where it is about 70 to 75 volume percent crystalline. Due to the composition of the frits of the present invention, firing can take place in reducing, inert or oxidizing atmospheres. Of particular interest is the fact that firing can take place in a reducing or inert atmosphere without causing the fired frit to become conductive. In order to ensure good sealing between the glass joints, pressure can be applied to the surface to be sealed. As previously mentioned, it is preferable that the glass frit be applied with an organic binder so as to prewet the glass surfaces to be joined. Otherwise, prior to crystallization of the frit material, the glass flow is somewhat limited. Generally, the organic binder employed should be capable of completely burning out or volatilizing well below the sealing temperature of the glass. Although a solution of 1–3% nitrocellulose in amyl-acetate has been previously described, other organic binders can be substituted for firing in an inert or reducing atmosphere, e.g., 40 weight percent polymethyl styrene (molecular weight 960) in diethylene glycol dibutyl ether.

Figure 3:
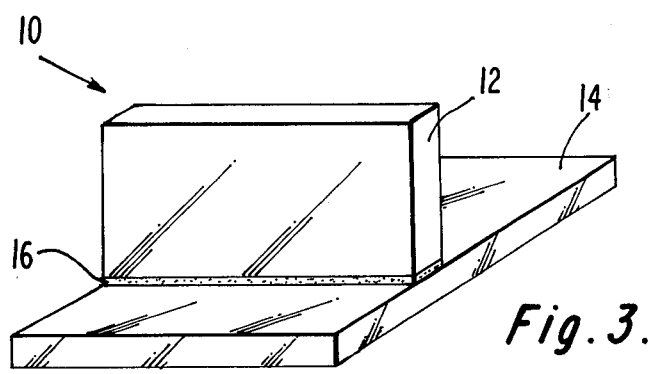
FIG. 3 is a perspective view showing one form of composite article of the present invention.

The use of the frit compositions of the present invention have resulted in glass plate structures which have sufficient structural integrity so as to be useful in the previously described display devices. The frit composition has been found to be well suited for making glass structures which include highly rigid right angle joints between plates of window glass, such as the article 10 shown in FIG. 3. In FIG. 3, two orthogonal preformed plates 12 and 14 of window glass are sealed together with a body 16 of sealing material. The sealing material is one prepared in accordance with the present invention. I have found that these glass plate structures may be reheated to 550° C with no strain in the joints and no deterioration or mechanical deformation of the seal. During this reheating, I have observed no movement of the glass plates.

I claim:

1. A devitrifiable glass frit consisting essentially by weight on an oxide basis of about 10–20% BaO, 10–11% $Li_2O$, 2–7% $Al_2O_3$, and 66–77% $B_2O_3$.

2. A glass frit in accordance with claim 1 which consists essentially by weight on an oxide basis of about 10.5–16.7% BaO, 10–11% $Li_2O$, 2–3% $Al_2O_3$, and 70–77% $B_2O_3$.

3. A composite article comprising at least two preformed glass bodies with sealing material disposed therebetween, said sealing material comprising a devitrified glass consisting essentially by weight on an oxide basis of about 10–20% BaO, 10–11% $Li_2O$, 2–7% $Al_2O_3$, and 66–77% $B_2O_3$.

4. A composite article in accordance with claim 3 in which said sealing material consists essentially by weight on an oxide basis of about 10.5–16.7% BaO, 10–11% $Li_2O$, 2–3% $Al_2O_3$, and 70–77% $B_2O_3$.

5. A composite article in accordance with claim 4 in which said two preformed bodies comprise window glass.

6. A composite article in accordance with claim 5 in which said devitrified glass has a temperature coefficient of expansion of about $90 \times 10^{-7}/°$ C.

7. A composite article in accordance with claim 6 in which said devitrified glass is about 70 to about 75 volume percent crystalline.

* * * * *